United States Patent [19]

Ferraro

[11] Patent Number: 4,652,831

[45] Date of Patent: Mar. 24, 1987

[54] INFLAMMABLE GAS DETECTOR WITH PREARRANGED ACTION

[75] Inventor: Roberto Ferraro, Florence, Italy

[73] Assignee: Controfugas, S.r.l., Florence, Italy

[21] Appl. No.: 609,975

[22] Filed: May 14, 1984

[30] Foreign Application Priority Data

May 17, 1983 [IT] Italy .................................. 9433 A/83

[51] Int. Cl.[4] .............................................. G01N 27/62

[52] U.S. Cl. ..................................... 324/464; 340/633; 422/98

[58] Field of Search ................. 324/464, 465, DIG. 1; 73/23, 27 R; 340/632-634; 330/296; 422/94, 96, 98

[56] References Cited

U.S. PATENT DOCUMENTS

| | | | |
|---|---|---|---|
| 3,239,828 | 3/1966 | Peterman | 340/633 |
| 3,399,398 | 8/1968 | Becker et al. | 340/633 |
| 3,577,167 | 5/1971 | Avins | 330/296 |
| 4,352,087 | 9/1982 | Wittmaier | 422/98 |
| 4,384,934 | 5/1983 | de Bruin et al. | 324/464 |

*Primary Examiner*—Stewart J. Levy
*Assistant Examiner*—Kevin D. O'Shea
*Attorney, Agent, or Firm*—McAulay, Fields, Fisher, Goldstein & Nissen

[57] ABSTRACT

An inflammable gas detector for detecting an inflammable gas wherein the inflammable gas detector is of the platinum-alloy wire type which forms part of a resistance bridge network to operate in a condition for maximum sensitivity by preadjusting the voltage at the terminals of the inflammable gas detector in accordance with the desired type of gas to be detected, then utilizing the signals supplied by the detector in the resistance bridge network to bring the cathode of a diode to the threshold limit value and at the same time to render two further diodes conductive to activate a signal or control relay or both.

20 Claims, 1 Drawing Figure

INFLAMMABLE GAS DETECTOR WITH PREARRANGED ACTION

BACKGROUND OF THE INVENTION

1. Field of the Invention

The present invention relates to an inflammable gas detector with prearranged action.

2. Description of the Prior Art

An inflammable gas detector is known from European Pat. No. 82830111.9 consisting of a detecting element in the form of a spiral with close windings and composed of a thin platinum-alloy wire inserted in a resistance bridge circuit, so that a variation of the detector resistance as a function of the density of the gas surrounding it will cause in the bridge circuit an imbalance that enables a system, which sets off an alarm and/or produces an action, to obtain a control signal. U.S. patent application Ser. No. 372,658 filed Apr. 28, 1982 and now abandoned corresponds to European Pat. No. 82830111.9.

Numerous tests have shown that the detecting element employed exhibits a variable sensitivity by varying the operating voltage, the level of said voltage depending upon the type of gas in which the detector is located. More specifically, it has been demonstrated that the DC supply voltage for maximum sensitivity and, therefore, for optimum response of the detector is 2 V for methane gase in a 2% concentration, and 1.6 V for propane-butane gas in a 0.8% concentration, and that the variation of the voltage measured at the terminals of the detector so supplied changing from the condition around it without gas to that with gas in the above-mentioned percentage is 0.2 V.

SUMMARY OF THE INVENTION

The major object of the present invention is to enable an inflammable gas detector of the platinum-alloy wire type, inserted in a resistance bridge circuit, to operate in a condition for maximum sensitivity.

Due to the above result, the present invention adopts the idea of preadjusting the voltage at the terminals of the detecting element inserted in an electrical bridge circuit to the level for maximum sensitivity depending upon the desired type of gas to be detected and, therefore, of utilizing the signals supplied by the aforementioned circuit in the presence of gas in order to bring the cathode of a diode to the threshold limit value and, at the same time, to make two diodes conductive and to activate a signal and/or control relay.

The advantages obtained by making use of the present invention resides essentially in the fact that the apparatus produces an optimum response for any type of gas that is to be detected, that the response is also optimal for any predetermined minimum value of the percentage of the gas to be detected, that said minimum value of the percentage of the gas to be detected can be adjusted quickly and accurately as required, and that the apparatus is very compact and very light in weight.

The invention will now be described in greater detail in conjunction with the accompanying drawing representing one specific embodiment of the invention.

BRIEF DESCRIPTION OF THE DRAWING

The one and only FIGURE represents the electrical diagram of an inflammable gas detector with prearranged action as taught by the invention and is designated FIG. 1.

DESCRIPTION OF THE BEST MODE AND PREFERRED EMBODIMENT

Figure 1:
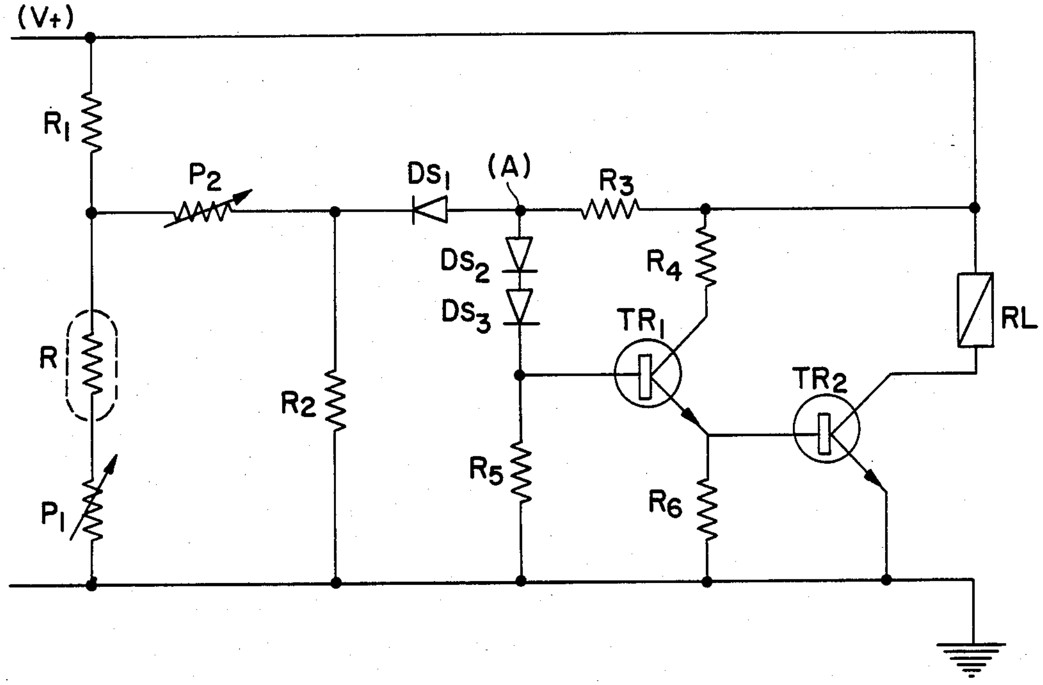

Reduced to its basic structure and with reference to the accompanying drawing, the apparatus of the invention includes:

a bridge circuit comprising two fixed resistors R1, R2, and two variable resistors P1, P2. Resistor P1 is capable of adjusting the voltage for maximum sensitivity of a detector R in relation to the desired type and concentration of the gas to be detected. Variable resistor or potentiometer P2 is capable of adjusting the potential at the cathode A of diode DS1. The prespecified voltage for maximum sensitivity is controlled by and supplied to terminals of detector R which is of the platinum-alloy wire type, and is inserted in a branch of said circuit. The electrical bridge circuit is capable of supplying at the terminals of detector R a prespecified voltage for maximum sensitivity.

an electronic circuit comprising a first diode DS1, two other diodes DS2, DS3 in series, two cascaded transistors TR1, TR2, four biasing resistors R3, R4, R5, R6, and a relay RL or similar device, the excitation of which enables one or more signal and/or control units to be activated: all said components are connected as shown in the circuit depicted in FIG. 1; the diode DS1 controls the operation of relay RL. When diode DS1 is non-conducting as a result of absence of gas to be detected because the potential at the cathode of diode DS1 is lower than the threshold limit value corresponding to the prespecified voltage for maximum sensitivity of the detector R, the transistor circuitry TR1 and TR2 are rendered inoperative and relay RL is deactivated;

a DC power supply circuit section stabilized with circuits of known construction and denoted with V+ in the drawing.

DESCRIPTION OF OPERATION

The operation is as follows:

In the rest condition, i.e., in the absence of the gas around the detector R that is to be detected, one brings as a first step, and working with the variable resistor or potentiometer P1, the prespecified voltage at the terminals of the detector R to the experimentally determined level for its maximum sensitivity, depending upon the desired type of gas to be detected, then, working with the variable resistor or potentiometer P2, the cathode potential at A is such that the diode DS1 is fixed at a voltage which is predetermined to be lower than the threshold limit value by a predetermined amount corresponding to the prespecified voltage for maximum sensitivity depending upon the desired type and concentration of the gas to be detected, so that, owing to the pressence of the diodes DS2 and DS3, and in the absence of the gas to be detected the base of the transistor TR1 is reverse-biased, thereby cutting off the transistors TR1 and TR2 and deactivating the relay RL.

In the presence of gas around the detector R in the concentration provided, the signals supplied by the electrical circuit bring the cathode of diode DS1 to the threshold limit value rendering the transistors TR1 and TR2 conductive. Specifically, a voltage variation occurs at the terminals of the detector R which manifests itself at point A of the circuit, and this causes the cathode of the diode DS1 to be brought to the threshold limit value: Thus, the transistor TR1 switches quickly and is rendered conductive which, in turn, renders the transistor TR2 conductive and causing the relay RL to be operative. This operating condition is maintained during the time that diode DS1 is rendered conductive in which the detector R detects a percentage of the gas provided which is higher than that provided for a prespecified level of safety because the potential at the cathode of diode DS1 is higher than the threshold limit corresponding to the prespecified voltage of maximum sensitivity of detector R.

Diodes DS2 and DS3 are in series with but oppositely directed from diode DS1 and therefore are capable of reverse-biassing the base of transistor TR1 so that the potential at the cathode A of diode DS1, the common series connection between diodes DS1 and DS2, is lower than the threshold limit value.

EXAMPLE OF OPERATION

Below are shown the values of the essential device components used in a specific operation:

R1: 4.7 Ohm 5 W
R2: 100 Ohm ½ W
R3: 390 Ohm ½ W
R4: 560 Ohm ½ W
R5: 6.8 KOhm ½ W
R6: 150 Ohm ½ W
P1, P2: 100 Ohm
TR1: BC 208
TR2: 2N1711
V+: 5 V CC.

INFLAMMABLE GAS DETECTOR WITH PREARRANGED ACTION

In order to detect the presence of an inflammable gas of prespecified type and concentration by means of a detecting element R consisting of a spiral with close windings and made of a thin platinum-alloy wire inserted in a resistance bridge circuit that operates in a condition for maximum sensitivity, a bridge circuit is utilized having the fixed resistors R1 and R2 and the potentiometers P1 and P2, and an electronic circuit with the diodes DS1, DS2, DS3, the transistors TR1, TR2, the biasing resistors R3, R4, R5, R6, and the relay RL in the circuit assembly illustrated in the drawing,in which the voltage across the terminals of the detector R is preadjusted with potentiometer P1 to the experimentally predetermined value for maximum sensitivity with respect to the desired type and concentration of the gas to be detected, and the potential at the cathode A of the diode DS1 is fixed with potentiometer P2 at a level that is lower than the threshold limit value by an experimentally determined amount in relation to the aforementioned voltage for maximum sensitivity of the detector R. In the absence of gas, the base of the transistor TR1 is reverse-biased so that the transistors TR1, TR2 and the relay RL are cut off; in the presence of gas in the predetermined concentration, the variation of the voltage across the terminals of the detector R brings the cathode A of the diode DS1 to the threshold limit value, making the transistors TR1, TR2 conductive and energizing the relay.

I claim:

1. An inflammable gas detector for achieving an optimum response thereof for any type and relative predetermined concentration of gas and to operate in a condition for maximum sensitivity and comprising in combination:

a detecting element R responsive to a prespecified voltage for maximum sensitivity and being composed of a thin platinum-alloy wire spiral with close windings and inserted in a branch of an electrical resistance bridge circuit and responsive to the predetermined concentration of gas to operate in a condition for maximum sensitivity depending on the type of gas;

said electrical resistance bridge circuit supplies at the terminals of said detecting element R a prespecified voltage solely for maximum sensitivity;

an electronic circuit comprising a diode DS1, transistors TR1, TR2 and a relay RL connected to said electrical resistance bridge circuit;

said diode DS1 having a potential at the cathode which is predetermined to be lower than the threshold limit value corresponding to said prespecified voltage for maximum sensitivity of said detecting element R and in the absence of the gas to be detected, said transistors TR1, TR2 are cut off and said relay RL deactivated; and in the presence of the detected gas, the signals supplied by said electrical resistance bridge circuit bring the cathode of said diode DS1 to the threshold limit value, rendering said transistors TR1, TR2 conductive and energizing said relay RL.

2. The inflammable gas detector as set forth in claim 1, wherein said electrical resistance bridge circuit comprises a first variable resistor P1 for adjusting the voltage for maximum sensitivity of said detector R in relation to the desired type and concentration of the gas to be detected.

3. The inflammable gas detector as set forth in claim 1, wherein said diode DS1 is connected with said electrical resistance bridge circuit and said electrical resistance bridge circuit further comprises a variable resistor P2 connected across said diode DS1 for adjusting the potential at the cathode A of said diode DS1.

4. The inflammable gas detector as set forth in claim 1, wherein said electronic circuit additionally comprises two diodes DS2, DS3 directly connected in series with said transistor TR1 and with said diode DS1 for reverse-biasing the base of said transistor TR1 so that the potential at the cathode A of said diode DS1 is lower than the threshold limit value.

5. The inflammable gas detector as set forth in claim 2, wherein said diode DS1 is connected with said electrical resistance bridge circuit and said electrical resistance bridge circuit further comprises a fixed resistor and a variable resistor P2 having a common connection connected wth said diode DS1 for adjusting the voltage across said bridge circuit and the potential at the cathode A of said diode DS1.

6. The gas detector as set forth in claim 2, wherein said electronic circuit additionally comprises two diodes DS2, DS3 directly connected in series with each other and said transistor TRI for reverse-biasing the base of said transistor TR1 so that the potential at the cathode A of said diode DS1 is lower than the threshold limit value.

7. The inflammable gas detector as set forth in claim 3, wherein said diode DS1 is connected with said electrical resistance bridge circuit and said electrical resistance bridge circuit further comprises a variable resistor P2 in series with said detecting element R and in series with said diode DS1 for adjusting the potential at the cathode A of said diode DS1.

8. The inflammable gas detector as set forth in claim 1, wherein said electrical resistance bridge circuit comprises in opposite arms thereof first and second variable resistors in series with each other through detecting element R, said first variable resistor adjusts the voltage for maximum sensitivity of said detecting element R in relation to the concentration of the gas to be detected, and said second variable resistor being in series with said diode DS1 and said detecting element R and adjusts the potential at the cathode of said diode.

9. A system for detecting an inflammable gas using an inflammable gas detector of the platinum-alloy wire type which forms part of a resistance bridge network to operate in a condition for maximum sensitivity comprising means for preadjusting the voltage at the terminals of said inflammable gas detector in accordance with the desired type of gas to be detected, and means associated with said inflammable gas detector for utilizing the signals supplied by said detector in said resistance bridge network to bring the cathode of a diode to the threshold limit value and at the same time to render at least one further diode conductive to activate at least one of a signal and a control relay.

10. The system as claimed in claim 9, wherein an optimum response is produced for the gas to be detected and the response can be made optimal for any predetermined minimum value of the percentage of the gas to be detected, and including means to adjust the minimum value of the gas to be detected.

11. The system as claimed in claim 9, wherein said bridge network comprises two fixed and two variable resistors in circuit with said detector, said detector being in one branch of said bridge circuit.

12. The system as claimed in claim 9, wherein said first-mentioned diode and said at least one further diode form an electronic circuit with each other and said resistance bridge network.

13. The system as claimed in claim 12, wherein said two further diodes are in series with each other and with said first-mentioned diode, and said electronic circuit includes a relay in series with said two further diodes and first and second transistors and being connected thereacross with the collectors of said transistors.

14. The system as claimed in claim 13, including a first biasing resistor connected between a common connection of the emitter of said first transistor and the base of said second transistor and the emitter of said second transistor; a second biasing resistor connected between the collector of said first transistor and said relay; a third biasing resistor connected between a common connection of said first diode and said two further diodes, and said relay and said second resistor; and a fourth resistor connected between the base of said first transistor and said emitter of said second transistor.

15. The system of claim 14, wherein in the rest condition, the voltage at the terminals of said detector is brought to its experimentally determined level for its maximum sensitivity by varying a first variable resistor in said bridge network, then the cathode of said first diode is fixed at a voltage lower than the threshold limit value by a predetermined amount depending upon the desired type and concentration of the gas to be detected by varying a second variable resistor in said bridge network, said two other diodes being effective to reverse-bias said base of said first transistor to render said first and said second transistors non-conductive and to deactivate said relay.

16. The system of claim 15, wherein said common connection between said first diode and said two further diodes is responsive to the presence of gas around said detector in the concentration provided to cause the cathode of said first diode to be brought to its threshold limit value, thereby switching said first transistor rapidly and rendering said second transistor conductive to operate said relay.

17. The system of claim 15, wherein said first variable resistor is in one leg of said bridge network, and said second variable resistor is in the other leg of said bridge network.

18. The system of claim 16, wherein said first variable resistor is in one leg of said bridge network, and said second variable resistor is in the other leg of said bridge network.

19. The system of claim 18, wherein said bridge network comprises two fixed and two variable resistors in circuit with said detector, said detector being in one branch of said bridge circuit.

20. The system of claim 19, wherein an optimum response is produced for the gas to be detected and the response can be made optimal for any predetermined minimum value of the percentage of the gas to be detected, and means to adjust the minimum value of the gas to be detected.

* * * * *